(12) United States Patent
Li et al.

(10) Patent No.: US 11,412,139 B2
(45) Date of Patent: Aug. 9, 2022

(54) TRAFFIC MONITORING DEVICE CAPABLE OF SWITCHING CAMERA MODE

(71) Applicant: HEFEI NORMAL UNIVERSITY, Anhui (CN)

(72) Inventors: Dachuang Li, Anhui (CN); Dongcai Liu, Anhui (CN); Shan Jiang, Anhui (CN)

(73) Assignee: HEFEI NORMAL UNIVERSITY, Anhui (CN)

( * ) Notice: Subject to any disclaimer, the term of this patent is extended or adjusted under 35 U.S.C. 154(b) by 302 days.

(21) Appl. No.: 16/954,196

(22) PCT Filed: Jan. 9, 2019

(86) PCT No.: PCT/CN2019/070947
§ 371 (c)(1),
(2) Date: Jun. 15, 2020

(87) PCT Pub. No.: WO2019/137385
PCT Pub. Date: Jul. 18, 2019

(65) Prior Publication Data
US 2021/0168288 A1 Jun. 3, 2021

(30) Foreign Application Priority Data

Jan. 10, 2018 (CN) .......................... 201810024751.5

(51) Int. Cl.
*H04N 5/232* (2006.01)
*G08G 1/04* (2006.01)
(Continued)

(52) U.S. Cl.
CPC .......... *H04N 5/23245* (2013.01); *G08G 1/04* (2013.01); *G08G 1/052* (2013.01); *G08G 1/065* (2013.01);
(Continued)

(58) Field of Classification Search
CPC .. H04N 5/23245; H04N 5/2256; H04N 5/332; G08G 1/04; G08G 1/052; G08G 1/054; G08G 1/065
See application file for complete search history.

(56) References Cited

U.S. PATENT DOCUMENTS

| | | | | |
|---|---|---|---|---|
| 5,161,107 | A  * | 11/1992 | Mayeaux | G06V 10/143 |
| | | | | 382/104 |
| 2016/0171312 | A1* | 6/2016 | Aoki | G07B 15/063 |
| | | | | 382/105 |
| 2017/0345295 | A1* | 11/2017 | Mattar | G08G 1/04 |

FOREIGN PATENT DOCUMENTS

| | | |
|---|---|---|
| CN | 101105892 | 1/2008 |
| CN | 201274542 | 7/2009 |

(Continued)

*Primary Examiner* — Daniel M Pasiewicz
(74) *Attorney, Agent, or Firm* — JCIP Global Inc.

(57) ABSTRACT

The present application discloses a traffic monitoring device capable of switching camera modes, comprising a sensor group, a infrared camera group, a visible light camera group, a visible light camera head, a infrared camera head, a head driver and a digital signal processor. The sensor group comprises pressure sensor, photoelectric displacement sensor and photosensitive sensor; the infrared camera and the visible light camera collect image information. The above devices are used as the detection front ends connected to the digital signal processor. The head driver adjusts the angle of the visible light camera and the infrared camera in real time. The system described in this application has two working modes: continuous shooting and interval shooting, which shortens the working time of the system, extends the life of the system, and reduces the cost of the system. The shooting camera can be switched according to the light intensity, to avoid the dazzling effect of supplementary visible light on human eyes, and to reduce hidden dangers to traffic safety. The camera angle can be fine-tuned with no dead angle (Continued)

shooting. License plate recognition and illegal shooting can be performed at all weather.

10 Claims, 4 Drawing Sheets

(51) Int. Cl.
  *G08G 1/052* (2006.01)
  *G08G 1/065* (2006.01)
  *H04N 5/33* (2006.01)
  *H04N 7/18* (2006.01)
  *H04N 5/225* (2006.01)

(52) U.S. Cl.
  CPC ............. *H04N 5/2256* (2013.01); *H04N 5/33* (2013.01); *H04N 5/332* (2013.01); *H04N 7/181* (2013.01)

(56) References Cited

FOREIGN PATENT DOCUMENTS

| | | |
|---|---|---|
| CN | 201750493 | 2/2011 |
| CN | 103037152 | 4/2013 |
| CN | 202887451 | 4/2013 |
| CN | 103781261 | 5/2014 |
| CN | 203851201 | 9/2014 |
| CN | 204101868 | 1/2015 |
| CN | 105894821 | 8/2016 |
| CN | 205486800 | 8/2016 |
| CN | 107026967 | 8/2017 |
| CN | 108109393 | 6/2018 |
| JP | 2005006066 | 1/2005 |
| JP | 2005286535 | 10/2005 |

\* cited by examiner

TRAFFIC MONITORING DEVICE CAPABLE OF SWITCHING CAMERA MODE

CROSS-REFERENCE TO RELATED APPLICATION

This application is a 371 of international application of PCT application serial no. PCT/CN2019/070947, filed on Jan. 9, 2019, which claims the priority benefit of China application no. 201810024751.5, filed on Jan. 10, 2018. The entirety of each of the above mentioned patent applications is hereby incorporated by reference herein and made a part of this specification.

TECHNICAL FIELD

The present invention relates to the field of intelligent transportation technology, and in particular, to traffic monitoring device capable of switching camera mode.

BACKGROUND ART

Flash is more and more widely used in the field of transportation. At present, the electronic eye used on the road capture is supplemented with visible incandescent light. The driver's eyes are easily stimulated by strong light and cause dazzling, which is likely to cause traffic accidents. The stronger the brightness of the incandescent light, the higher the ambient temperature, which affects the effect of the camera collecting images. At night, the light is very dark, the clarity of the pictures taken is poor, and it is difficult to capture more details of the violations. In actual electronic eye capture applications, the system cannot adjust the light intensity of the fill light device as the ambient light changes, resulting in high power consumption of the fill light, waste of power, and shortened equipment life. When the traffic situation is complicated, the shooting angle cannot be adjusted intelligently, and there is a dead angle in shooting.

Patent CN105894821A discloses a comprehensive traffic monitoring system based on high-definition DSP camera, including image acquisition unit and data storage unit, which can realize functions such as license plate recognition, speed measurement, flow statistics, etc., and then periodically send the stored images and data to the central platform via the data transmission unit. The device uses LED strobe fill light or LED constant fill light, which can not switch the camera. When the light is not ideal, the fill light can easily cause dazzling effects on the human eye, there are hidden dangers to traffic safety. The shooting angle cannot be adjusted, and there is a dead end.

Patent CN205486800U discloses an infrared electronic police system. The system comprises control terminal, control module, data management module, infrared detection module, and image acquisition module, which improves the data processing capability, transmission capability, and camera capability. Patent CN204101868U discloses an intelligent high-definition electronic police infrared flash, including LED infrared flash and remote control, which can be connected to different types of mounting bases. After installation and fixation, it can still adjust the direction to change the irradiation angle, and can remotely change the flash light intensity.

Patent CN201220554356 discloses an electronic police system integrating infrared and visible light supplementary light, which can solve the effect of over-brightness of LED lights, and can solve the color shift phenomenon of infrared fill light. The overall quality of the night picture of the camera in color mode is improved. The device only adjusts the light spot shape formed by the LED lamp bead module, the effect is difficult to control and detect.

The above device only uses infrared camera instead of visible light camera. The infrared camera turns on for a long time, causing high power consumption, long working time of the camera, short life, high system price, and is not suitable for large-scale promotion.

SUMMARY OF THE INVENTION

In order to solve the above technical problems, this application provides a traffic monitoring device capable of switching infrared camera modes. The system is rich in functions, and the infrared camera is used to ensure clear imaging in the case of weak light, avoiding the dazzling effect of the visible light camera fill light device on the driver, ensuring the safety of the driver and passengers and the stability of the traffic order. And the system switches the visible light camera to shoot when the ambient light is ideal, which shortens the working time of the infrared camera, extends the system life, and reduces the system price.

To achieve the above purpose, this application provides the following technical solutions: a traffic monitoring device capable of switching camera modes comprises sensor group, infrared camera group, visible light camera group, LED light emitting array, visible light camera head, infrared camera head, head driver and digital signal processor; the sensor group comprises photoelectric displacement sensor, pressure sensor, photosensitive sensor and infrared sensor; the data collected by the photoelectric displacement sensor is transmitted to the digital signal processor for measuring the driving speed of the vehicle; the pressure sensor is connected with the digital signal processor to determine whether a vehicle is passing and to feedback vehicle flow information; the data collected by the photosensitive sensor is transmitted to the digital signal processor, and compared with the set light intensity standard value by the digital signal processor, and the shooting camera is switched; the infrared sensor can detect infrared radiation in the surrounding environment; the image information collected by the infrared camera and the visible light camera is returned to digital signal processing; in the visible light camera mode, the LED light emitting array is used to supplement the light of the visible light camera group; the head driver is used to receive the signal generated by the digital signal processor to drive the camera head to adjust the shooting angle of the camera; the digital signal processor is used to process the data collected by the sensors and the two cameras and output control signals.

Further, the system is designed with a storage unit for storing road information database. In actual traffic monitoring, the digital signal processor compares the collection data results of the pressure sensor with the database standard values, and switches between two working modes: interval shooting and continuous shooting. The system works in interval shooting mode when working on road sections or time periods with low traffic flow, and the continuous shooting mode when working on road sections or time periods with high traffic flow.

Further, the light sensing front end of the photosensitive sensor is installed on a cantilever. The digital signal processor can compare the brightness of the surrounding light of the camera with the set standard value of light intensity according to the data collected by the photosensitive sensor. When the light is ideal, the visible light camera is used to shoot, and adjust the fill light according to the actual weather conditions. When the light is not ideal, the infrared camera is switched to.

Further, the number of sensors comprised in the pressure sensor group is equal to the number of lanes, the sensing front end of the sensor is buried under the corresponding lane, the length of which spans the entire lane. The center line of the camera's field of view is directly opposite the pressure sensor. The digital signal processor distinguishes the vehicles according to the change of the signal strength collected by the pressure sensor, and also plays the role of judging whether the vehicle passes or not and waking up the camera in the interval shooting mode.

Further, both the infrared camera and the visible light camera are equipped with head, which can be installed on the cantilever to fine-tune the angle to prevent shooting dead angles. The installation number of the heads can be determined according to the camera's field of view angle and road width. The formula is as follows:

$$D = 2 \times S \times \tan\frac{\alpha}{2}$$

In the formula, D is the shooting width of a single camera, S is the shooting distance from the camera to the ground, a is the angle of view of the camera. The road width and the shooting width of a single camera are compared to determine the number of cameras, where the number of cameras needs to meet the following conditions:

$$M > \frac{W}{D}$$

where M is the number of cameras, W is the road width, and D is the shooting width of a single camera. Considering that the field of view of cameras arranged side by side will cross each other, the number of cameras should be greater than the ratio of the road width to the shooting width of a single camera.

Further, the photoelectric displacement sensor is installed directly below the camera perpendicular to the ground, the collected data of which is transmitted to a digital signal processor for measuring the driving speed of the vehicle. The formula is as follows:

$$V = \frac{S}{t_2 - t_1}$$

in the formula, V is the average speed of the vehicle, S is the displacement of the vehicle, and $t_2-t_1$ is the light reflection time difference. The measured average speed of the vehicle is compared with the current lane speed limit to determine whether the vehicle is speeding.

Further, The infrared camera is equipped with a filter, which can adjust the infrared band actually radiated by the vehicle to match the best shooting band of the infrared camera. With the camera's automatic gain control (AGC) circuit, the gain of the amplifier can be adjusted automatically with changes in the internal and external illumination, so that the infrared camera can work in a larger illumination range and can obtain clear images under low illumination conditions.

Further, the LED light emitting array is a matrix-type light-emitting array, which can adjust the number of LED lights turned on in the array according to the signal detected by the photosensitive sensor to realize multi-level fill light.

Further, the system needs to be debugged regularly. There is a calibration object in the field of imaging. The infrared camera illuminates the calibration object and it is compared with the set gray value. The parameters such as the aperture and gain of the infrared camera are adjusted by establishing a mathematical model. It avoids the phenomenon of color drift caused by long-term work in harsh environments and enhances the robustness of the system.

Further, the digital signal processor generates four-way pulse-width modulation signals, which is connected to the Darlington transistor through each phase drive circuit, to control the output of each phase winding of the stepper motor to make the stepper motor rotate forward, reverse, accelerate, decelerate and stop with different pulse width modulation signals.

Compared with the prior art, this application has the following beneficial effects:

1. The light emitted by the infrared LED light emitting array is invisible to the human eye, avoiding the dazzling effect on the human eye due to the excessively bright visible light fill light, and reducing hidden dangers to traffic safety.

2. The system can be switched between two working modes, including continuous shooting and interval shooting, according to the comparison of the traffic flow and database, to shorten the system working time and reduce power consumption while ensuring the safety of traffic supervision.

3. The system has two groups of cameras, the visible light camera is used when the light is good, and the infrared camera is used when the light is weak. It shortens the working time of the infrared camera, effectively extends the life of the system, and reduces the cost of hardware replacement.

DETAILED DESCRIPTION OF THE EMBODIMENTS

Figure 1:
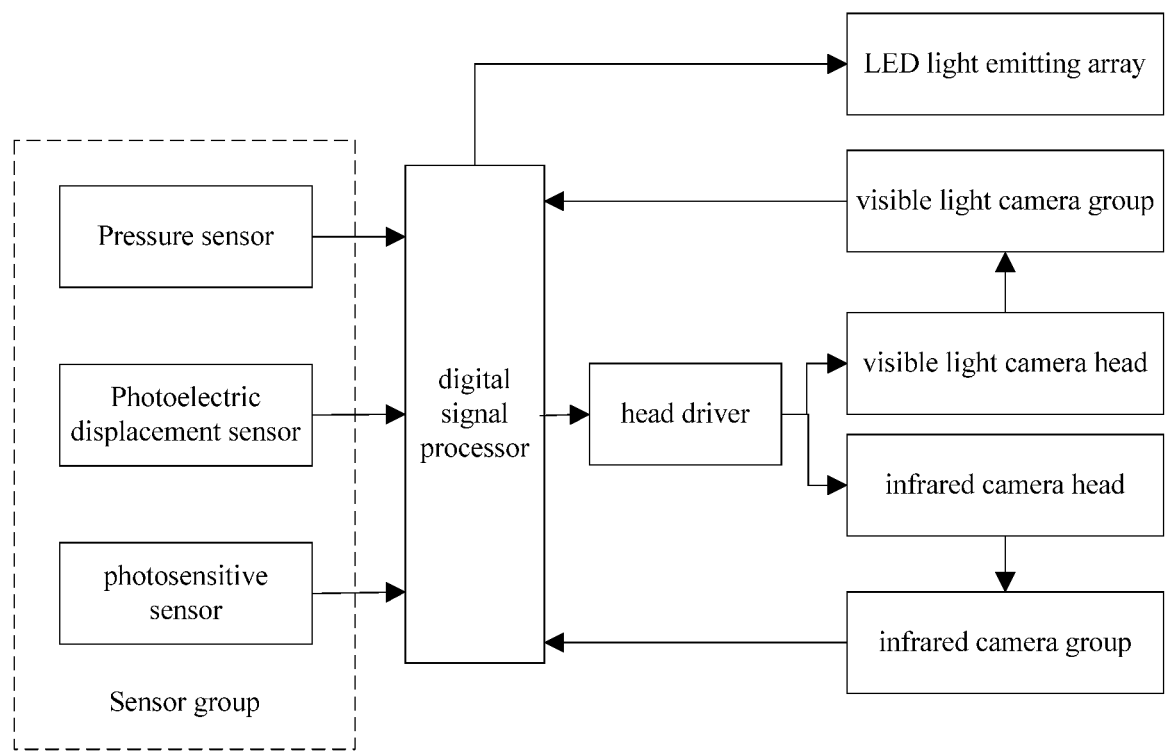
FIG. 1 is a principle block diagram of the system of the present application.

The traffic monitoring device capable of switching camera modes as shown in FIG. 1 comprises sensor group, infrared camera group, visible light camera group, LED light emitting array, visible light camera head, infrared camera head, head driver and digital signal processor;

the sensor group comprises photoelectric displacement sensor, pressure sensor, photosensitive sensor and infrared sensor; the data collected by the photoelectric displacement sensor is transmitted to the digital signal processor for measuring the driving speed of the vehicle; the pressure sensor is connected with the digital signal processor to determine whether a vehicle is passing, the data collected by the photosensitive sensor is transmitted to the digital signal processor to switch the shooting camera; the image information collected by the infrared camera and the visible light camera is returned to digital signal processing; in the visible light camera mode, the LED light emitting array is used to supplement the light of the visible light camera group, the head driver is used to receive the signal generated by the digital signal processor to drive the camera head to adjust the shooting angle of the camera; the digital signal processor is used to process the data collected by the sensors and the two cameras and output control signals.

Figure 2:
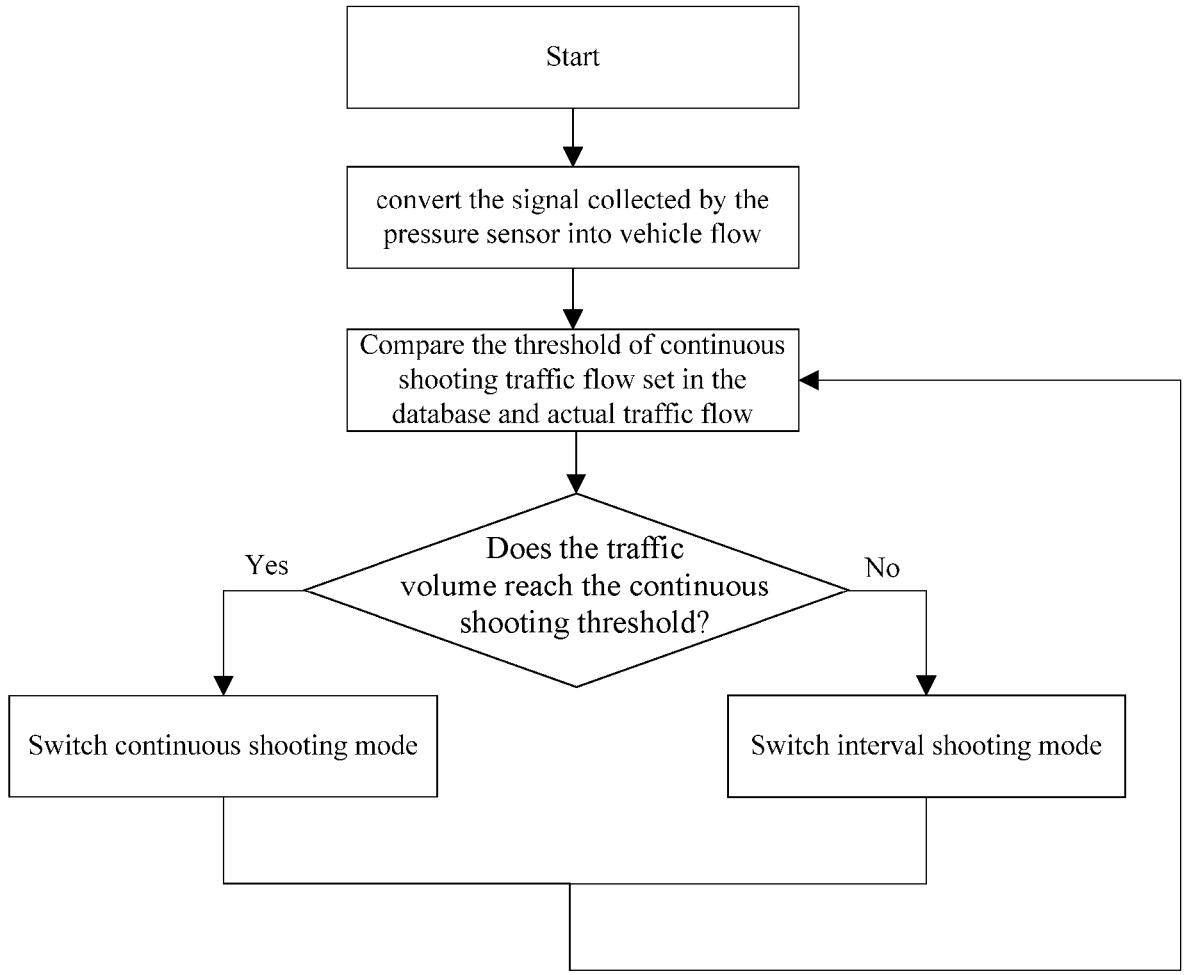
FIG. 2 is a flowchart of continuous shooting and interval shooting mode.

As shown in FIG. 2, the pressure sensing front end of the pressure sensor is installed underground, the length of which spans the entire road, and the center line of the camera's field of view is directly opposite the pressure sensing front end. The digital signal processor receives the data collected from the pressure sensor and outputs control signal to the head driver to intelligently adjust the camera's shooting angle to capture live pictures without dead angles. The collected signal is compared with the database and the current traffic flow by the digital signal processor. The output control signal is transmitted to the camera to determine whether the camera works in continuous shooting mode or interval shooting mode. The image information collected by the camera is returned to the digital signal processor, and the result of the license plate image recognition is finally output according to the processing characteristics of the license plate image. At the same time, the data collected by the photoelectric displacement sensor installed next to the camera and perpendicular to the ground is transmitted to the digital signal processor for measuring the speed of the vehicle. According to the difference of the amount of reflected light and the reflection time of each vehicle, the driving displacement S of the vehicle and the time difference $t_2-t_1$ are measured to obtain the average speed of the vehicle:

$$V = \frac{S}{t_2 - t_1}$$

then, which is compared with the current lane speed limit to determine whether the vehicle is speeding.

The digital signal processor controls the shooting mode to interval shooting or continuous shooting, which specific operation is that: the signal collected by the pressure sensor is transmitted to the digital signal processor, after analysis and calculation, it is compared with the standard value of the traffic flow set according to the previously collected traffic flow database; the digital signal processor judges to make a decision, the continuous shooting mode is switched to when the traffic volume is greater than the standard value, and the interval shooting mode is switched to when the traffic volume is less than the standard value; finally, the collected signals are sent back to the digital signal processor to continuously increase the amount of database information; with the longer time of use, the larger the amount of database information formed, the more the adjusted traffic flow standard value is in line with the actual road conditions, and the decision made by the digital signal processor is more in line with the current actual situation, thereby realizing two working modes, saving, extending the life of the camera, reducing costs, and improve shooting efficiency.

Figure 3:
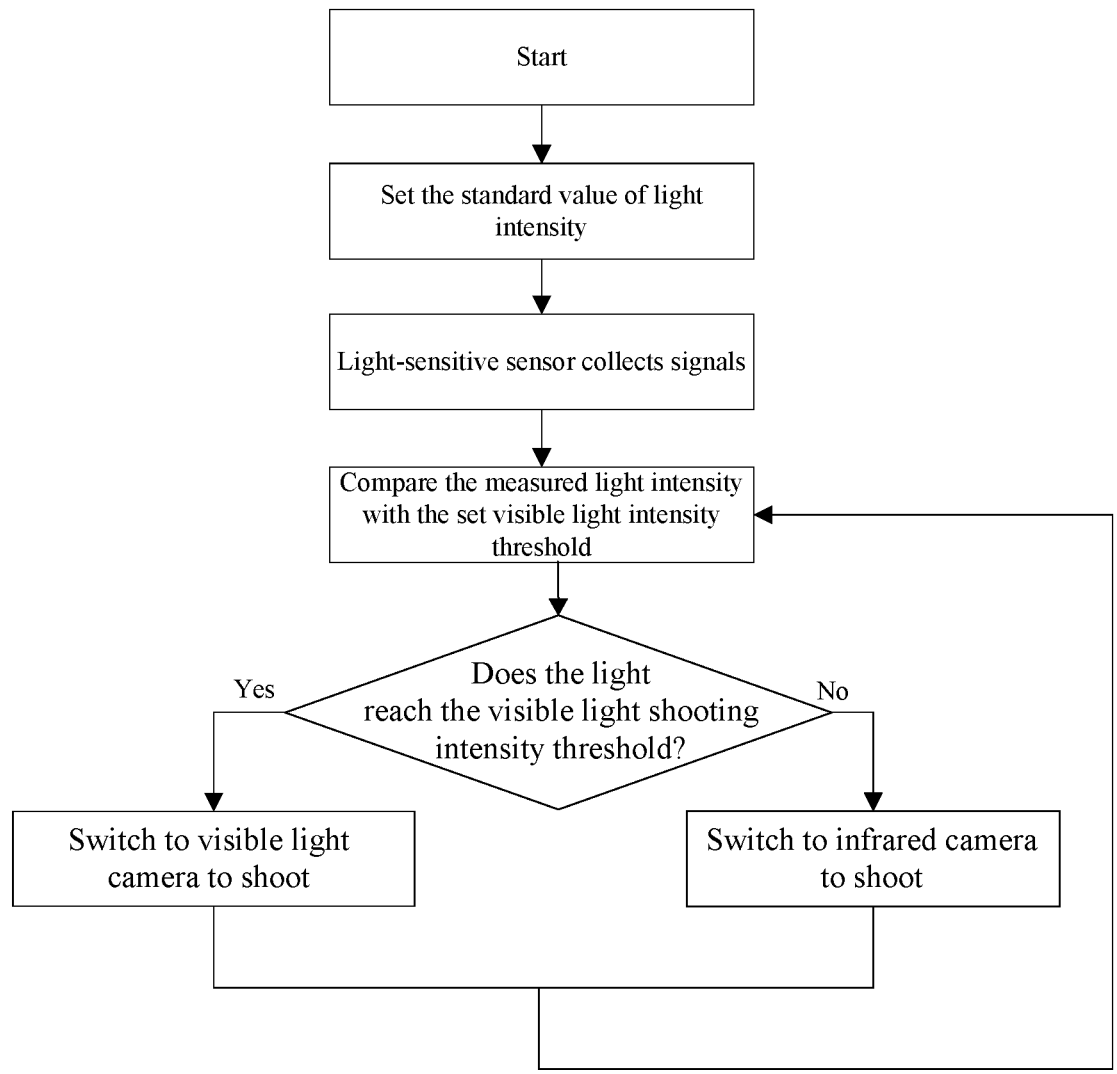
FIG. 3 is a flowchart of switching between shooting cameras.

As shown in FIG. 3, before the camera takes a picture, the light sensing front end of the photosensitive sensor installed on the cantilever collects the brightness and darkness of the ambient light around the camera. The collected data is processed by the digital signal processor and compared with the light intensity standard set according to actual needs. If the collected signal value is greater than the set light intensity standard value, it means the light intensity, the visible light camera is switched to shoot, and the LED light emitting array is used to fine-tune the fill light according to the actual weather; otherwise, the infrared camera is switched to. In the visible light camera mode, the number of LED lights turned on is controlled by the LED light-emitting array to realize the adjustment of the multi-level fill light amount.

Figure 4:
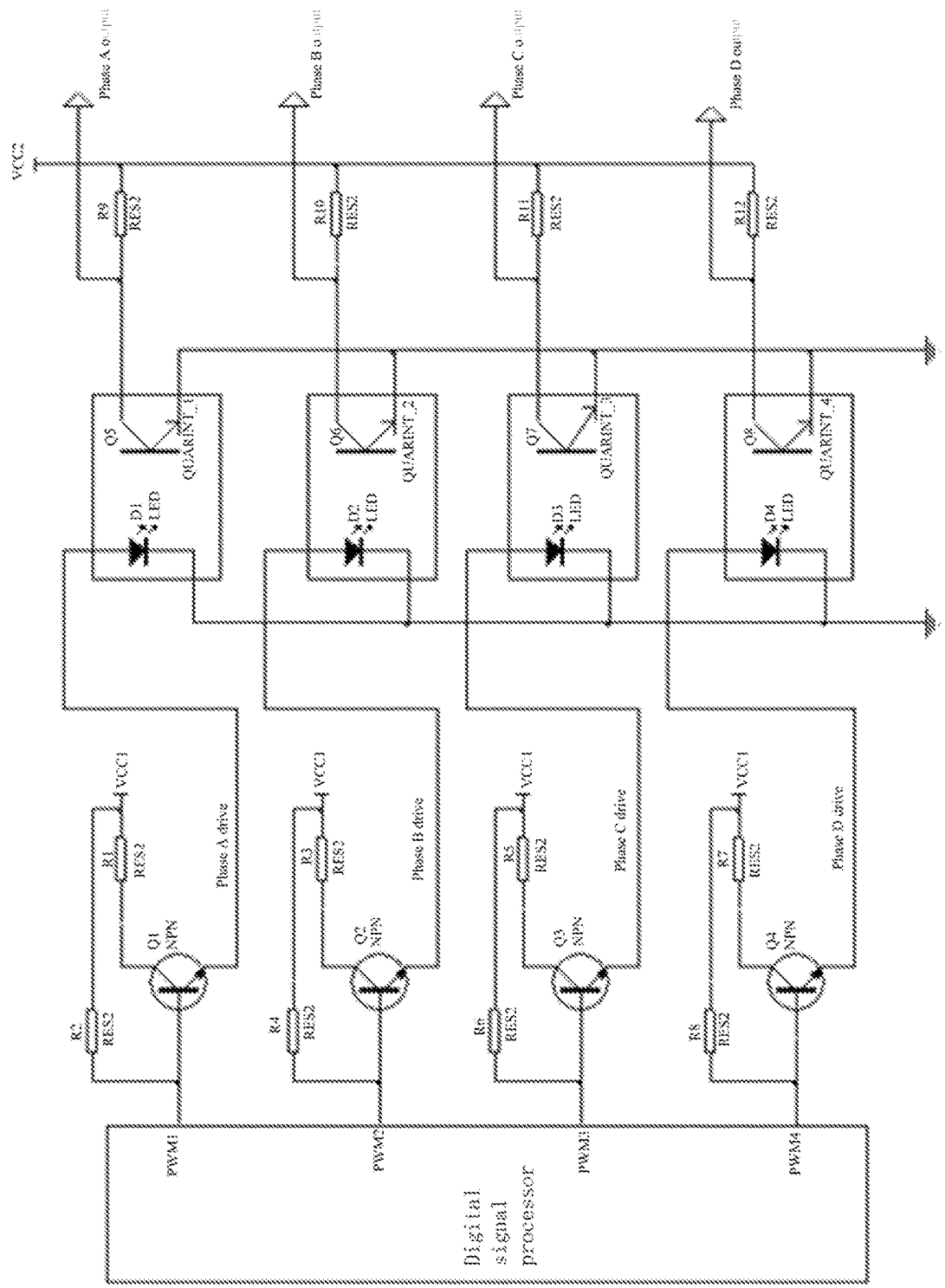
FIG. 4 is a working circuit diagram of the head driver.

As shown in FIG. 4, the head driver adjusts the camera shooting angle. Specifically, the drive circuit contains four sets of Darlington transistors as electronic switches to control whether the four sets of coils A, B,/A, /B of the stepper motor are electrified or not respectively. The pulse width modulation signals PWM1~PWM4 are generated by the DSP and transmitted to each phase of the four-phase stepper motor. According to the working principle of the stepper motor, if the positive sequence is energized and commutated according to the given working mode, the stepper motor rotates forward; if power is switched in reverse order, the stepper motor reverses; if a control pulse is sent to the stepper motor, it will turn a step angle, and if it sends another pulse, it will turn another step angle. The shorter the interval between the two pulses, the faster the stepper motor rotates and the faster the camera rotates. Therefore, the frequency f of the pulse determines the speed of the stepper motor, and the speed of the stepper motor is proportional to the pulse within the controllable speed range. The speed of each minute of the stepper motor can be calculated by the following formula:

$$n = \frac{60f}{zN}$$

in the formula, f is the pulse frequency, z is the number of rotor teeth, and N is the number of beats. Stepping motor can be adjusted by adjusting the pulse frequency. When the digital signal processor receives the signal from the sensor, it will generate a pulse width modulated wave, drive the stepper motor to rotate, and control the camera's shooting angle.

Although the embodiments of the present application have been shown and described, those of ordinary skill in the art may understand that various changes, modifications, substitutions and variants can be made to these embodiments without departing from the principle and spirit of the present application. The scope of the application is defined by the appended claims and their equivalents.

What is claimed is:

1. A traffic monitoring device capable of switching camera modes, comprises a sensor group, an infrared camera, a visible light camera and a digital signal processor, wherein the sensor group comprises a photoelectric displacement sensor, a pressure sensor and a photosensitive sensor; the data collected by the photoelectric displacement sensor is transmitted to the digital signal processor for measuring the driving speed of the vehicle; the pressure sensor is connected with the digital signal processor to determine the passing situation of the vehicle to control the camera shooting mode; the data collected by the photosensitive sensor is transmitted to the digital signal processor, and after being processed, a control signal is output to switch the shooting camera; the image information collected by the infrared camera and the visible light camera is returned to the digital signal processor.

2. The traffic monitoring device capable of switching camera modes according to claim 1, wherein the traffic monitoring device further comprising: a visible light camera head, an infrared camera head and a head driver; the pressure sensing front end of the pressure sensor is installed under a lane, the digital signal processor receives the data collected from the pressure sensor and outputs the control signal to the head driver, the head driver adjusts the visible light camera head or infrared camera head to adjust the camera's shooting angle.

3. The traffic monitoring device capable of switching camera modes according to claim 2, wherein the number of sensors comprised in the pressure sensor is equal to the number of lanes, the length of the sensing front end of the pressure sensor spans the entire lane, the center line of the camera's field of view is directly opposite the pressure sensor.

4. The traffic monitoring device capable of switching camera modes according to claim 2, wherein the installation number of the visible light camera head or the infrared camera head is determined by the shooting width of the camera and road width, the formula is as follows:

$$D = 2 \times S \times \tan\frac{\alpha}{2}$$

in the formula, D is the shooting width of a single camera, S is the shooting distance from the camera to the ground, a is the angle of view of the camera, the road width and the shooting width of a single camera are compared to determine the number of cameras.

5. The traffic monitoring device capable of switching camera modes according to claim 1, wherein the system is designed with a storage unit for storing road traffic flow information database, the data collected by the pressure sensor is compared with the standard value of the vehicle flow set in the database after processed by the digital signal processor, and it is switched between the interval shooting and continuous shooting modes according to the comparison result.

6. The traffic monitoring device capable of switching camera modes according to claim 1, wherein the driving speed of the vehicle is calculated through the data collected by the photoelectric displacement sensor by the formula as follows:

$$V = \frac{S}{t_2 - t_1}$$

in the formula, V is the average speed of the vehicle, S is the displacement of the vehicle, and $t_2-t_1$ is the light reflection time difference.

7. The traffic monitoring device capable of switching camera modes according to claim 1, wherein the digital signal processor generates pulse-width modulation signals based on position information fed back by the pressure sensor, which is connected to a Darlington transistor through each phase drive circuit, to control the output of each phase winding of a stepper motor to make the stepper motor rotate forward, reverse, accelerate, decelerate or stop with different pulse width modulation signals, in order to control the movement of the driving head and adjust the camera shooting angle.

8. The traffic monitoring device capable of switching camera modes according to claim 1, wherein there is a calibration object in the field of imaging, which the infrared camera illuminates and compared with the set gray value, thus the parameters such as the aperture and gain of the infrared camera are adjusted by establishing a mathematical model.

9. The traffic monitoring device capable of switching camera modes according to claim 1, wherein the digital signal processor compares the data collected by the photo-sensitive sensor with the set standard value of light intensity to output a control signal; when the light is ideal and no fill light is required, the visible light camera is switched to, and when the light is not ideal, the infrared camera is switched to.

10. The traffic monitoring device capable of switching camera modes according to claim 1, wherein the traffic monitoring device capable further comprising: a LED light emitting array, wherein the digital signal processor can control the LED light emitting array to supplement the light of the camera according to the light intensity detected by the photosensitive sensor.

* * * * *